United States Patent
Yeh et al.

(10) Patent No.: US 9,200,566 B2
(45) Date of Patent: Dec. 1, 2015

(54) CARBONYLS REMOVAL SYSTEM

(71) Applicant: Saudi Arabian Oil Company, Dhahran (SA)

(72) Inventors: Gene Yeh, Dhahran (SA); Ibrahim Al-Babtain, Dammam (SA); Hussain Al-Qahtani, Dhahran (SA); Saeed Al-Alloush, Dammam (SA)

(73) Assignee: SAUDI ARABIAN OIL COMPANY (SA)

( * ) Notice: Subject to any disclaimer, the term of this patent is extended or adjusted under 35 U.S.C. 154(b) by 121 days.

(21) Appl. No.: 14/262,905

(22) Filed: Apr. 28, 2014

(65) Prior Publication Data

US 2015/0308336 A1    Oct. 29, 2015

(51) Int. Cl.
*C10K 1/00*      (2006.01)
*B01D 53/047*    (2006.01)
(Continued)

(52) U.S. Cl.
CPC ............... *F02C 3/20* (2013.01); *B01D 53/047* (2013.01); *F02C 3/04* (2013.01); *B01D 2253/104* (2013.01); *B01D 2253/106* (2013.01); *B01D 2257/706* (2013.01); *B01D 2259/402* (2013.01); *B01D 2259/40062* (2013.01)

(58) Field of Classification Search
CPC ........... F02C 3/04; F02C 3/20; B01D 53/047; B01D 2253/104; B01D 2253/107; B01D 2257/706; B01D 2259/40062; B01D 2259/402
USPC ................ 95/92, 96–98, 133, 236; 96/121; 423/210
See application file for complete search history.

(56) References Cited

U.S. PATENT DOCUMENTS 3,086,340 A    4/1963    Schmeckenbecher
4,740,361 A    4/1988    Heyd et al.
(Continued)

FOREIGN PATENT DOCUMENTS

JP    S62275120 A    11/1987
WO    2004/0069381 A1    8/2004
(Continued)

OTHER PUBLICATIONS

PCT International Search Report and The Written Opinion; dated Jun. 29, 2015; International Application No. PCT/US2015/027253; International File Date: Apr. 23, 2015.
(Continued)

*Primary Examiner* — Frank Lawrence
(74) *Attorney, Agent, or Firm* — Bracewell & Giuliani LLP; Constance Gall Rhebergen

(57) ABSTRACT

A method to limit the deposition of metals from a syngas stream on a gas turbine comprising the steps of feeding the syngas stream to a pressure swing adsorption vessel of a pressure swing adsorption system, the syngas stream comprises carbonyls, the pressure swing adsorption vessel configured to perform a pressure swing adsorption cycle: adsorbing the carbonyls on a carbonyl selective adsorbent, leaving a turbine feed stream, reducing the pressure of the pressure swing adsorption vessel to a purge pressure less than the adsorbing pressure, purging the carbonyls from the carbonyl adsorbed adsorbent to create a tail gas stream, re-pressurizing the regenerated carbonyl adsorbent to the adsorbing pressure, feeding the tail gas stream to an incinerator configured to oxidize the carbonyls in the tail gas stream to metal oxides and carbon dioxide, and feeding the turbine feed stream to the gas turbine.

20 Claims, 1 Drawing Sheet

(51) Int. Cl.
*F02C 3/20* (2006.01)
*F02C 3/04* (2006.01)

(56) References Cited

U.S. PATENT DOCUMENTS

| | | | |
|---|---|---|---|
| 6,165,428 A * | 12/2000 | Eijkhoudt | B01D 53/02 423/210 |
| 7,252,702 B2 * | 8/2007 | Al-Babtain | B01D 53/047 95/141 |
| 7,438,079 B2 | 10/2008 | Cohen et al. | |
| 7,597,743 B2 | 10/2009 | Ravikumar et al. | |
| 7,741,377 B2 | 6/2010 | Van Den Berg et al. | |
| 7,793,675 B2 | 9/2010 | Cohen et al. | |
| 7,918,922 B2 | 4/2011 | Gouman et al. | |
| 8,187,365 B2 | 5/2012 | Kodde et al. | |
| 8,465,570 B2 | 6/2013 | Alban et al. | |
| 2010/0269516 A1 | 10/2010 | Brautsch et al. | |
| 2011/0112347 A1 | 5/2011 | Van Den Berg et al. | |
| 2013/0098243 A1 * | 4/2013 | Beato | B01D 53/02 95/133 |
| 2014/0366728 A1 * | 12/2014 | Kerestecioglu | B01D 53/1425 95/203 |

FOREIGN PATENT DOCUMENTS

| | | |
|---|---|---|
| WO | 2004/089499 A2 | 10/2004 |
| WO | 2008/037726 A1 | 4/2008 |

OTHER PUBLICATIONS

Boll, W., et al.; Gas Production, 3. Gas Treating, 2. Carbon Monoxide Shift Conversion; Ullmann's Encyclopedia of Industrial Chemistry; Oct. 15, 2011; pp. 1-8; Wiley-VCH Verlag GmbH & Co. KGaA, Weinheim.

* cited by examiner

CARBONYLS REMOVAL SYSTEM

FIELD OF THE INVENTION

This invention relates to an apparatus and process for removing carbonyls from a syngas stream. More specifically, this invention provides an apparatus and process for removing carbonyls from a syngas stream using pressure swing adsorption technology.

BACKGROUND OF THE INVENTION

An integrated gasification combined cycle (IGCC) complex converts fossil fuel to power and hydrogen ($H_2$). IGCC complexes include a gasification step, an acid gas removal section, a power generation section, and hydrogen recovery units. The fossil fuels are fed to a gasifier in the gasification step. Fossil fuels fed to gasifier can include coal, vacuum resid (VR), and high sulfur fuel oil (HSFO).

In gasifiers, the fossil fuel feed is reacted with pure oxygen and steam to produce syngas at an elevated temperature and pressure. Syngas from the gasifiers is then sent to the acid gas removal (AGR) section for removal of acidic gases such as hydrogen sulfide ($H_2S$) and carbon dioxide ($CO_2$). One common AGR process includes a hydrolysis reactor to convert carbonyl sulfide (COS) to $H_2S$ and $CO_2$. The $H_2S$ and $CO_2$ are fed to an acid gas absorber to remove the $H_2S$ and at least a portion of the $CO_2$ from the stream. Part of the effluent from the AGR process is sent to a power generation system to produce electricity, and the remainder is sent to a hydrogen recovery unit (HRU) to recover and produce $H_2$. The power generation section typically uses a combustion turbine to generate electricity.

In addition to acid gases, the syngas contains ppm levels of nickel carbonyl ($Ni(CO)_4$) (Ni-carbonyl) and iron pentacarbonyl ($Fe(CO)_5$) (Fe-carbonyl). Ni-carbonyl and Fe-carbonyl are toxic and pose significant risks to health and the environment. In addition, carbonyls in the syngas can be deposited in the gas turbine during combustion. The deposition of carbonyls decreases the efficiency of the performance of the gas turbines. Therefore, some IGCC systems include a carbonyl treatment step upstream of the gas turbines.

Commonly, the carbonyl treatment bed upstream of the gas turbines includes an activated carbon bed (ACB). The syngas stream is passed through the ACB to remove carbonyls before being combusted in the gas turbine to generate power. The carbonyls are adsorbed on the activated carbon. The spent carbon, with carbonyls adsorbed, is then burned in a kiln to eliminate the adsorbed carbonyls.

The activated carbon in an ACB requires replacement every few months, depending on the carbonyl content in the feed, in a labor intensive replacement process. The process to remove adsorbed carbonyls provides a potential point at which carbonyls can be released into the atmosphere, making even the removal process hazardous.

In other methods, sacrificial metals are used to remove the carbonyls in the carbonyl treatment step. Sacrificial metals, such as ZnS, cannot be regenerated and must be discarded. The disposal of the sacrificial metals poses significant safety risks.

Therefore, a process that reduces the risk of carbonyls to the gas turbine and reduces the risks due to carbonyl exposure is desired.

SUMMARY OF THE INVENTION

This invention relates to an apparatus and process for removing carbonyls from a syngas stream. More specifically, this invention provides an apparatus and process for removing carbonyls from a syngas stream using pressure swing adsorption technology.

In a first aspect of the present invention, a method to limit the deposition of metals, from a syngas stream generated by a gasifier, on a gas turbine is provided. The method includes the steps of feeding the syngas stream from an acid gas removal process to a pressure swing adsorption vessel of a pressure swing adsorption system, wherein the syngas stream includes carbonyls, the pressure swing adsorption vessel configured to perform a pressure swing adsorption cycle. The pressure swing adsorption cycle includes the steps of adsorbing the carbonyls from the syngas stream on a carbonyl selective adsorbent at an adsorbing pressure to create a carbonyl adsorbed adsorbent, wherein adsorbing the carbonyls generates a turbine feed stream, reducing the pressure of the pressure swing adsorption vessel to a purge pressure, the purge pressure being less than the adsorbing pressure, wherein the carbonyls dump from the carbonyl adsorbed adsorbent while the pressure is being reduced, purging the carbonyls from the pressure swing adsorption vessel with the purge gas, wherein the purged carbonyls form a tail gas stream, wherein purging the carbonyls leaves a regenerated carbonyl adsorbent in the pressure swing adsorption vessel, and re-pressurizing the pressure swing adsorption vessel to the adsorbing pressure, wherein re-pressurizing the regenerated carbonyl adsorbent restores the carbonyl selective adsorbent, feeding the tail gas stream to an incinerator, the incinerator configured to oxidize the carbonyls in the tail gas stream to metal oxides and carbon dioxide, and feeding the turbine feed stream to the gas turbine, the turbine feed stream having a target carbonyl contamination.

In certain aspects of the present invention, the method further includes the step of maintaining the adsorbing pressure in the pressure swing adsorption vessel in a stand-by stage. In certain aspects of the present invention, the carbonyls comprise nickel carbonyls, iron carbonyls, and combinations thereof. In certain aspects of the present invention, the carbonyl selective adsorbent comprises silica gel and alumina. In certain aspects of the present invention, the carbonyl selective adsorbent is in the absence of activated carbon. In certain aspects of the present invention, the adsorbing pressure is between 200 psig and 800 psig. In certain aspects of the present invention, the purge gas is selected from the group consisting of nitrogen, hydrogen, carbon monoxide, syngas and combinations thereof. In certain aspects of the present invention, the purge pressure is between 7 psig and 15 psig. In certain aspects of the present invention, the target carbonyl contamination in the gas turbine stream is less than 0.1 ppm by volume. In certain aspects of the present invention, the pressure swing adsorption system comprises two pressure swing adsorption vessels, each pressure swing adsorption vessel configured to perform a pressure swing adsorption cycle.

In a second aspect of the present invention, a system for power generation is provided. The system includes a gasifier, the gasifier configured to convert a fossil fuel feed to dirty syngas, the dirty syngas stream includes acid gases, an acid gas removal process fluidly connected to the gasifier, the acid gas removal process configured to remove acid gases from the dirty syngas to create a syngas stream, the syngas stream comprising syngas, carbonyls, and contaminants, a pressure swing adsorption system fluidly connected to the acid gas removal process, the pressure swing adsorption system configured to remove the carbonyls from the syngas stream. The pressure swing adsorption system includes a pressure swing adsorption vessel, the pressure swing adsorption vessel configured to perform a pressure swing adsorption cycle. The pressure swing adsorption cycle includes the steps of adsorbing the carbonyls from the syngas stream on a carbonyl selective adsorbent to create a carbonyl adsorbed adsorbent, wherein adsorbing the carbonyls generates a turbine feed stream, the turbine feed stream having a target carbonyl contamination, reducing the pressure of the pressure swing adsorption vessel to a purge pressure, the purge pressure being less than the adsorbing pressure, wherein the carbonyls dump from the carbonyl adsorbed adsorbent while the pressure is being reduced, purging the carbonyls from the pressure swing adsorption vessel with the purge gas, wherein the purged carbonyls form a tail gas stream, wherein purging the carbonyls leaves a regenerated carbonyl adsorbent in the pressure swing adsorption vessel, and re-pressurizing the regenerated carbonyl adsorbent to the adsorbing pressure, wherein re-pressurizing the regenerated carbonyl adsorbent restores the carbonyl selective adsorbent. The system further includes an incinerator fluidly connected to the pressure swing adsorption vessel, the incinerator configured to oxidize the carbonyls in the tail gas stream to metal oxides and carbon dioxide and a gas turbine fluidly connected to the pressure swing adsorption system, the gas turbine configured to generate power from the turbine feed stream.

In certain aspects of the present invention, the method further includes the step of maintaining the adsorbing pressure in the pressure swing adsorption vessel in a stand-by stage. In certain aspects of the present invention, the carbonyls comprise nickel carbonyls, iron carbonyls, and combinations thereof. In certain aspects of the present invention, the carbonyl selective adsorbent comprises silica gel and alumina. In certain aspects of the present invention, the carbonyl selective adsorbent is in the absence of activated carbon. In certain aspects of the present invention, the adsorbing pressure is between 200 psig and 800 psig. In certain aspects of the present invention, the purge gas is selected from the group consisting of nitrogen, hydrogen, carbon monoxide, syngas, and combinations thereof. In certain aspects of the present invention, the purge pressure is between 7 psig and 15 psig. In certain aspects of the present invention, the target carbonyl contamination in the gas turbine stream is less than 0.1 ppm by volume. In certain aspects of the present invention, the pressure swing adsorption system comprises two pressure swing adsorption vessels, each vessel configured to perform a pressure swing adsorption cycle.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Figure 1:
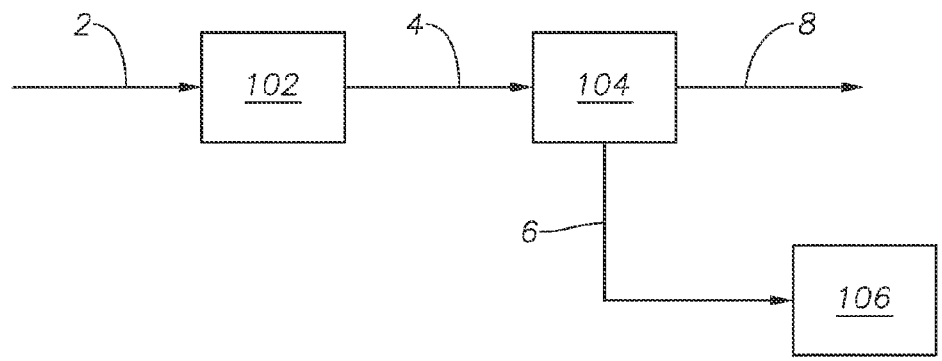
FIG. 1 is a process diagram of an embodiment of the present invention.

Referring to FIG. 1, an embodiment of a method of the present invention is provided. Acid syngas stream 2 enters acid gas removal (AGR) process 102. Acid syngas stream 2 contains acid gases such as carbon dioxide ($CO_2$) and hydrogen sulfide ($H_2S$) along with carbon monoxide (CO) and hydrogen ($H_2$), and contaminants. Exemplary contaminants include Ni-carbonyls, Fe-carbonyls, and combinations thereof. Acid syngas stream 2 can be any source of syngas comprising acid gases.

AGR process 102 removes acid gases from acid syngas stream 2 to create syngas stream 4. AGR process 102 can be any acid gas removal process that removes acid gases while leaving syngas. Syngas stream 4 contains syngas and contaminants. Exemplary contaminants include carbonyls, $CO_2$, carbonyl sulfide (COS), carbon-containing contaminants and combinations thereof. As used herein, carbonyls, encompasses Ni-carbonyl, Fe-carbonyls, and combinations thereof. The concentration of carbonyls in syngas stream 4 is greater than about 1 ppm by weight, alternately between about 0.5 ppm by volume and 1 ppm by volume, alternately between 1 ppm by volume and 5 ppm by volume, alternately between 2 ppm by volume and 4 ppm by volume, and alternately between 5 ppm by volume and 10 ppm by volume.

Syngas stream 4 is fed to a pressure swing adsorption vessel (not shown) of pressure swing adsorption system 104. In at least one embodiment of the present invention, AGR process 102 is upstream of pressure swing adsorption system 104 so the feed to pressure swing adsorption system 104 is in the absence of $H_2S$. The pressure swing adsorption vessel is loaded with the carbonyl selective adsorbent. The temperature of pressure swing adsorption system 104 is determined by the temperature of syngas stream 4. In at least one embodiment of the present invention, the temperature of syngas stream 4 is between about 30° C. (86° F.) and about 45° C. (113° F.)

The carbonyl selective adsorbent can be any adsorbent capable of adsorbing carbonyls from syngas stream 4 at an adsorbing pressure. The carbonyl selective adsorbent is selected based on the type and concentration of contaminants. Carbonyl selective adsorbents useful in the present invention can be custom designed or can be commercially available products. Exemplary carbonyl selective adsorbents include alumina, silica gel, activated carbon, graphite, and combinations thereof. In at least one embodiment the carbonyl selective adsorbent contains alumina and silica gel. In at least one embodiment, the carbonyl selective adsorbent is in the absence of activated carbon. The surface area of the carbonyl selective adsorbent is greater than about 100 $m^2/g$, alternately greater than about 200 $m^2/g$, alternately greater than about 300 $m^2/g$, alternately greater than about 400 $m^2/g$, and alternately greater than about 500 $m^2/g$. The average pore size of the carbonyl selective adsorbent is greater than about 5 Å, alternately greater than about 8 Å, alternately greater than about 10 Å, alternately greater than about 15 Å, alternately greater than about 20 Å, and alternately greater than about 25 Å. In a preferred embodiment of the present invention, the average pore size of the carbonyl selective adsorbent is greater than about 20 Å.

The pressure swing adsorption vessel is configured to undergo the pressure swing adsorption cycle. The pressure swing adsorption cycle involves adsorption, dumping, purging, re-pressurization, and stand-by stages. In at least one embodiment of the present invention, the stages of the pressure swing adsorption cycle, as described herein, overlap and are in the absence of defined stop and start points.

During the adsorption stage, syngas stream 4 is fed to the pressure swing adsorption vessel at the adsorbing pressure. The adsorbing pressure is any pressure at which carbonyls present in the syngas stream will selectively adsorb onto the carbonyl selective adsorbent. The adsorbing pressure is preferably between about 200 psig and about 800 psig, alternately between about 250 psig and about 500 psig, alternately between about 300 psig and about 400 psig. In a preferred embodiment of the present invention, the adsorbing pressure is between 300 psig (2.2 MPa) and 400 psig (2.9 MPa).

Syngas stream 4 flows over the carbonyl selective adsorbent and carbonyls are adsorbed from syngas stream 4 onto the carbonyl selective adsorbent creating a carbonyl adsorbed adsorbent and a clean syngas stream (not shown). The clean syngas stream contains the syngas from syngas stream 4, which is not adsorbed, and therefore, continues to flow over the carbonyl selective adsorbent. The adsorption stage continues until the concentration of carbonyls in the clean syngas stream is below a target carbonyl contamination. The target carbonyl contamination is the desired concentration of carbonyls in the clean syngas stream. In at least one embodiment of the present invention, the target carbonyl contamination is based on the specification of gas turbine 108. In at least one embodiment of the present invention, the target carbonyl contamination of the clean syngas stream is less than about 0.1 ppm by volume. The adsorption stage continues between 10 days and 60 days, alternately between 10 days and 40 days, alternately between 10 days and 30 days, and alternately between 10 days and 20 days. In at least one embodiment of the present invention, the adsorption time is less than 10 days. In a preferred embodiment of the present invention, the adsorption stage continues between 10 days and 20 days before the target carbonyl contamination of the clean syngas stream is attained. The clean syngas stream is continuously produced from the pressure swing adsorption vessel as turbine feed stream 8.

At the conclusion of the adsorption stage, the pressure swing adsorption vessel enters the dumping stage. During the dumping stage, the pressure in the pressure swing adsorption vessel is reduced toward a purge pressure. The purge pressure is less than the adsorbing pressure. The purge pressure is between atmospheric pressure and about 200 psig, alternately between atmospheric pressure and about 100 psig, alternately between atmospheric pressure and about 50 psig, alternately between atmospheric pressure and 15 psig, alternately between atmospheric pressure and 10 psig, alternately between 7 psig and 10 psig, and alternately between 7 psig and 15 psig. In a preferred embodiment, the purge pressure is between 7 psig and 15 psig. In at least one embodiment of the present invention, a purge gas is fed to the pressure swing adsorption vessel during the dumping stage. The purge gas is at a purge gas pressure. The purge gas can be any gas that will not adsorb on the carbonyl selective adsorbent at the adsorbing pressure. Exemplary purge gases include nitrogen, carbon monoxide, hydrogen, syngas, and combinations thereof. In at least one embodiment of the present invention, the purge gas is nitrogen. In at least one embodiment, a bleed valve is opened, allowing pressure to escape the pressure swing adsorption vessel.

As the pressure in the pressure swing adsorption vessel is reduced toward the purge pressure, carbonyls continuously desorb from the carbonyl adsorbed adsorbent. The process of reducing the vessel pressure to the purge pressure is also referred to as "dumping." During the dumping stage, as the carbonyls are desorbed from the carbonyl adsorbed adsorbent, the carbonyls are swept up by the purge gas and the carbonyls and the purge gas exit the pressure swing adsorption vessel as tail gas stream 6. Tail gas stream 6 is fed to incinerator 106. In at least one embodiment of the present invention, tail gas stream 6 includes clean syngas present in pressure swing adsorption vessel.

When the pressure in the pressure swing adsorption vessel reaches the purge pressure, the pressure swing adsorption cycle enters the purging stage. During the purging stage, the carbonyl adsorbed adsorbent is purged and regenerated with the purge gas to produce the regenerated carbonyl adsorbent. The carbonyls continue to exit the pressure swing adsorption vessel as tail gas stream 6. When all or substantially of the carbonyls are desorbed from the carbonyl adsorbed adsorbent, a regenerated carbonyl adsorbent remains. In at least one embodiment of the present invention, the regenerated adsorbent is in the absence of any adsorbed carbonyls. In at least one embodiment of the present invention, the purge gas continues for a purging time to ensure no carbonyls remain in the pressure swing adsorption vessel. The purging time continues from about 10 minutes to about 60 minutes, alternately from about 10 minutes to about 20 minutes, alternately from about 20 minutes to about 40 minutes, alternately from about 40 minutes to about 60 minutes, and alternately from about 30 minutes to about 60 minutes. In at least one embodiment of the present invention, the purging time is between 20 minutes and 40 minutes. In at least one embodiment of the present invention, clean syngas is used as the purge gas during the purging stage.

The dumping stage and the purging stage can take less than 60 minutes, alternately from between 10 minutes and 50 minutes, alternately between 20 minutes and 40 minutes, alternately between 20 minutes and 60 minutes, between alternately from between 30 minutes and 50 minutes, alternately greater than 60 minutes.

Incinerator 106 can be any type of thermal treatment unit capable of oxidizing the carbonyls in tail gas stream 6 to create metal oxides and carbon dioxide in an incinerator flue gas stream (not shown). In at least one embodiment of the present invention, incinerator 106 oxidizes other components present in tail gas stream 6, such as syngas. In at least one embodiment of the present invention, the temperature of incinerator 106 is between 900° C. and 1200° C. The carbon dioxide produced in incinerator 106 and present in the incinerator flue gas stream is vented to atmosphere. In at least one embodiment of the present invention, the metal oxides in the incinerator flue gas stream are removed from the incinerator flue gas before the incinerator flue gas is vented to atmosphere. In at least one embodiment of the present invention, the metal oxides are collected and disposed of by other means.

After the purging stage of the pressure swing adsorption cycle, the pressure swing adsorption vessel is re-pressurized to the adsorbing pressure. Re-pressurization can occur by any means capable of pressurizing a vessel. In at least one embodiment of the present invention, turbine feed stream 8 is used to re-pressurize the pressure swing adsorption vessel. Re-pressurization returns the regenerated adsorbent to the carbonyl selective adsorbent used in the adsorbing stage. The re-pressurization stage occurs in the absence of components adsorbed onto the carbonyl selective adsorbent. In at least one embodiment of the present invention, the re-pressurization stage begins with an equalization step where the pressure between the pressure swing adsorption vessel and a second pressure swing adsorption vessel in pressure swing adsorption system 104 is equalized.

Once the pressure swing adsorption vessel is re-pressurized to the adsorbing pressure, the pressure swing adsorption vessel enters the stand-by stage. During the stand-by stage, the pressure swing adsorption vessel is maintained at the adsorbing pressure, while awaiting a feed with carbonyls.

Turbine feed stream 8 is fed to gas turbine 108. Gas turbine 108 is part of a power generation process and will combust the syngas for use in the power generation process. In an alternate embodiment, turbine feed stream 8 can be used in any process that requires a feed or fuel stream containing syngas. The target carbonyl contamination of turbine feed stream 8 is less than about 0.1 ppm by volume, alternately, less than 0.05 ppm by volume, and alternately less than 0.01 ppm by volume.

The temperature of the pressure swing adsorption cycle is between 50° F. (10° C.) and 120° F. (48.9° C.). Temperature plays a key role in the differential adsorbent capacity, that is the adsorbent capacity at the adsorption pressure minus the adsorbent capacity at the purge pressure. In a preferred embodiment of the present invention, the temperature of the pressure swing adsorption cycle is between 90° F. (32.2° C.) and 110° F. (43.3° C.). The pressure swing adsorption cycle causes the carbonyls to adsorb and desorb from the carbonyl selective adsorbent due to the swing in pressure between the adsorbing pressure and the purge pressure. The pressure swing adsorption cycle occurs in the absence of a temperature swing cycle.

Pressure swing adsorption system 104 contains multiple pressure swing adsorption vessels. The number of pressure swing adsorption vessels is based on the process needs. In at least one embodiment of the present invention, pressure swing adsorption system 104 contains two pressure swing adsorption vessels. In at least one embodiment, pressure swing adsorption system 104 contains four pressure swing adsorption vessels. In an alternate embodiment of the present invention, pressure swing adsorption system 104 contains more than four pressure swing adsorption vessels. In a system having multiple pressure swing adsorption vessels, each pressure swing adsorption vessel is loaded with carbonyl selective adsorbent. In a system having multiple pressure swing adsorption vessels, each pressure swing adsorption vessel is configured to perform the entire pressure swing adsorption cycle. In a system having multiple pressure swing adsorption vessels, each pressure swing adsorption vessel operates at a different stage in the pressure swing adsorption cycle. With each pressure swing adsorption vessel operating at a different stage in the pressure swing adsorption cycle, the entire pressure swing adsorption process operates in a continuous mode. As used herein, continuous mode means that pressure swing adsorption system 104 continuously receives syngas stream 4, continuously produces turbine feed stream 8, and periodically produces tail gas stream 6. In continuous mode, a pressure swing adsorption vessel operates through the pressure swing adsorption cycle without being taken offline. In an alternate embodiment of the present invention, the pressure swing adsorption process operates in a batch mode.

In at least one embodiment of the present invention, the lifecycle of the carbonyl selective adsorbent is at least 10 years, alternately at least 5 years, alternately at least 1 year. As used herein, lifecycle indicates the length of time the carbonyl selectively adsorbent can operate before being replaced.

In at least one embodiment of the present invention, pressure swing adsorption system 104 is in the absence of a fixed bed.

Figure 2:
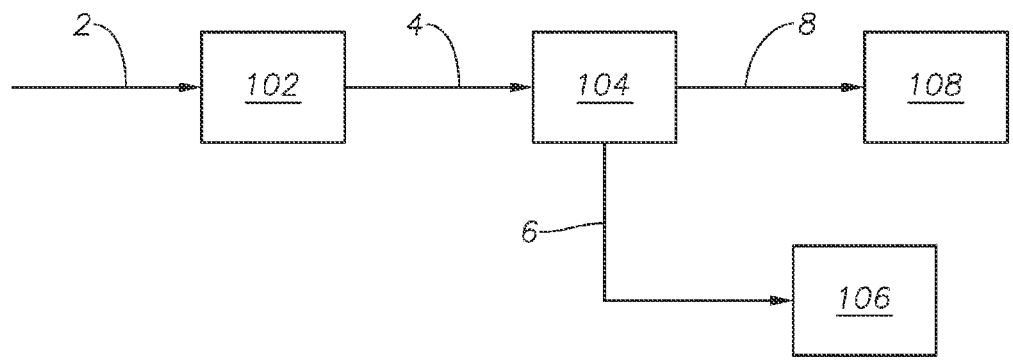
FIG. 2 is a process diagram of an alternate embodiment of the present invention.

Referring to FIG. 2, an embodiment of the system for power generation is provided. With reference to those elements disclosed in FIG. 1, turbine feed stream 8 is fed to gas turbine 108. Gas turbine 108 is any turbine that can combust syngas to generate power.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A method to limit the deposition of metals, from a syngas stream generated by a gasifier, on a gas turbine, the method comprising the steps of:

feeding the syngas stream from an acid gas removal process to a pressure swing adsorption vessel of a pressure swing adsorption system, wherein the syngas stream comprises carbonyls, the pressure swing adsorption vessel configured to perform a pressure swing adsorption cycle, the pressure swing adsorption cycle comprising the steps of:

adsorbing the carbonyls from the syngas stream on a carbonyl selective adsorbent at an adsorbing pressure to create a carbonyl adsorbed adsorbent, wherein adsorbing the carbonyls generates a turbine feed stream;

reducing the pressure of the pressure swing adsorption vessel to a purge pressure, the purge pressure being less than the adsorbing pressure, wherein the carbonyls desorb from the carbonyl adsorbed adsorbent while the pressure is being reduced;

purging the carbonyls from the pressure swing adsorption vessel with a purge gas, wherein the purged carbonyls form a tail gas stream, wherein purging the carbonyls leaves a regenerated carbonyl adsorbent in the pressure swing adsorption vessel; and re-pressurizing the pressure swing adsorption vessel to the adsorbing pressure, wherein re-pressurizing the regenerated carbonyl adsorbent restores the carbonyl selective adsorbent;

feeding the tail gas stream to an incinerator, the incinerator configured to oxidize the carbonyls in the tail gas stream to metal oxides and carbon dioxide; and feeding the turbine feed stream to the gas turbine, the turbine feed stream having a target carbonyl contamination.

2. The method of claim 1, further comprising the step of maintaining the adsorbing pressure in the pressure swing adsorption vessel in a stand-by stage.

3. The method of claim 1, wherein the carbonyls comprise nickel carbonyls, iron carbonyls, and combinations thereof.

4. The method of claim 1, wherein the carbonyl selective adsorbent comprises silica gel and alumina.

5. The method of claim 1, wherein the carbonyl selective adsorbent is in an absence of activated carbon.

6. The method of claim 1, wherein the adsorbing pressure is between 200 psig and 800 psig.

7. The method of claim 1, wherein the purge gas is selected from the group consisting of nitrogen, hydrogen, carbon monoxide, syngas and combinations thereof.

8. The method of claim 1, wherein the purge pressure is between 7 psig and 15 psig.

9. The method of claim 1, wherein the target carbonyl contamination in the turbine feed stream is less than 0.1 ppm by volume.

10. The method of claim 1, wherein the pressure swing adsorption system comprises two pressure swing adsorption vessels, each of the pressure swing adsorption vessels configured to perform the pressure swing adsorption cycle.

11. A system for power generation, the system comprising:

a gasifier, the gasifier configured to convert a fossil fuel feed to a dirty syngas stream, the dirty syngas stream comprising acid gases;

an acid gas removal process fluidly connected to the gasifier, the acid gas removal process configured to remove acid gases from the dirty syngas stream to create a syngas stream, the syngas stream comprising syngas, carbonyls, and contaminants;

a pressure swing adsorption system fluidly connected to the acid gas removal process, the pressure swing adsorption system configured to remove the carbonyls from the syngas stream, the pressure swing adsorption system comprising:

a pressure swing adsorption vessel, the pressure swing adsorption vessel configured to perform a pressure swing adsorption cycle, the pressure swing adsorption cycle comprising the steps of:

adsorbing the carbonyls from the syngas stream on a carbonyl selective adsorbent at an adsorbing pressure to create a carbonyl adsorbed adsorbent, wherein adsorbing the carbonyls generates a turbine feed stream, the turbine feed stream having a target carbonyl contamination;

reducing the pressure of the pressure swing adsorption vessel to a purge pressure, the purge pressure being less than the adsorbing pressure, wherein the carbonyls desorb from the carbonyl adsorbed adsorbent while the pressure is being reduced;

purging the carbonyls from the pressure swing adsorption vessel with a purge gas, wherein the purged carbonyls form a tail gas stream, wherein purging the carbonyls leaves a regenerated carbonyl adsorbent in the pressure swing adsorption vessel; and re-pressurizing the regenerated carbonyl adsorbent to the adsorbing pressure, wherein re-pressurizing the regenerated carbonyl adsorbent restores the carbonyl selective adsorbent;

an incinerator fluidly connected to the pressure swing adsorption vessel, the incinerator configured to oxidize the carbonyls in the tail gas stream to metal oxides and carbon dioxide; and a gas turbine fluidly connected to the pressure swing adsorption system, the gas turbine configured to generate power from the turbine feed stream.

12. The system of claim 11, wherein the pressure swing adsorption cycle further comprises the step of maintaining the adsorbing pressure in the pressure swing adsorption vessel in a stand-by stage.

13. The system of claim 11, wherein the carbonyls comprise nickel carbonyls, iron carbonyls, and combinations thereof.

14. The system of claim 11, wherein the carbonyl selective adsorbent comprises silica gel and alumina.

15. The system of claim 11, wherein the carbonyl selective adsorbent is in an absence of activated carbon.

16. The system of claim 11, wherein the adsorbing pressure is between 200 psig and 800 psig.

17. The system of claim 11, wherein the purge gas is selected from the group consisting of nitrogen, hydrogen, carbon monoxide, syngas, and combinations thereof.

18. The system of claim 11, wherein the purge pressure is between 7 psig and 15 psig.

19. The system of claim 11, wherein the target carbonyl contamination in the turbine feed stream is less than 0.1 ppm by volume.

20. The system of claim 11, wherein the pressure swing adsorption system comprises two pressure swing adsorption vessels, each vessel configured to perform the pressure swing adsorption cycle.

* * * * *